United States Patent [19]

Aoyagi et al.

[11] Patent Number: 4,571,941

[45] Date of Patent: Feb. 25, 1986

[54] HYDRAULIC POWER SYSTEM

[75] Inventors: Yukio Aoyagi; Eiki Izumi; Sotaro Tanaka, all of Ibaraki; Takeshi Yamaguchi, Tsuchiura, all of Japan

[73] Assignee: Hitachi Construction Machinery Co, Ltd., Tokyo, Japan

[21] Appl. No.: 333,555

[22] Filed: Dec. 22, 1981

[30] Foreign Application Priority Data

| | | | |
|---|---|---|---|
| Dec. 27, 1980 | [JP] | Japan | 55-187132 |
| Dec. 27, 1980 | [JP] | Japan | 55-187134 |
| Feb. 13, 1981 | [JP] | Japan | 56-19067 |

[51] Int. Cl.[3] ..... F16H 39/46

[52] U.S. Cl. ..... 60/466; 60/435; 60/436; 60/444; 91/461

[58] Field of Search ..... 60/428, 429, 430, 486, 60/488, 489, 452, 460, 466, 435, 436, 441, 443, 444; 91/461, 41, 44, 45

[56] References Cited

U.S. PATENT DOCUMENTS

| | | | |
|---|---|---|---|
| 3,125,324 | 3/1964 | Vivier | 60/466 |
| 3,881,317 | 5/1975 | Swoager | 60/444 |
| 3,908,376 | 9/1975 | Steiger | 60/428 |
| 3,913,453 | 10/1975 | Parquet | 60/460 |
| 3,943,714 | 3/1976 | Reinker | 91/461 |
| 3,960,059 | 6/1976 | Schexnayder | 91/461 |
| 3,972,185 | 8/1976 | Medina | 60/486 |
| 4,014,198 | 3/1977 | Herrmann | 60/489 |
| 4,126,082 | 11/1978 | Klitz | 91/41 |
| 4,199,942 | 4/1980 | Kasper | 60/452 |
| 4,212,164 | 7/1980 | Young | 60/452 |
| 4,317,331 | 3/1982 | Aruga et al. | 60/436 |
| 4,350,078 | 9/1982 | Olofsson | 91/461 |
| 4,395,878 | 8/1983 | Morita et al. | 60/444 |

*Primary Examiner*—Charles T. Jordan
*Assistant Examiner*—Richard Klein
*Attorney, Agent, or Firm*—Antonelli, Terry & Wands

[57] ABSTRACT

A hydraulic power system having a variable displacement hydraulic pump, a hydraulic motor driven by the hydraulic pump for actuating a load, with the pump and motor being connected to constitute a closed hydraulic circuit. A hydraulic servo controls the displacement volume of the pump, and a motor stop arrangement prevents, in its operative position, the motor from rotating. The system includes a control valve responsive to a main line pressure in the closed hydraulic circuit for controlling a hydraulic fluid supply to the hydraulic servo to prevent the main line pressure from substantially exceeding a predetermined level, and a control is responsive to the operation of the hydraulic servo for releasing the motor stop arrangement from the operative position when the hydraulic servo is operating.

18 Claims, 8 Drawing Figures

F I G. 3
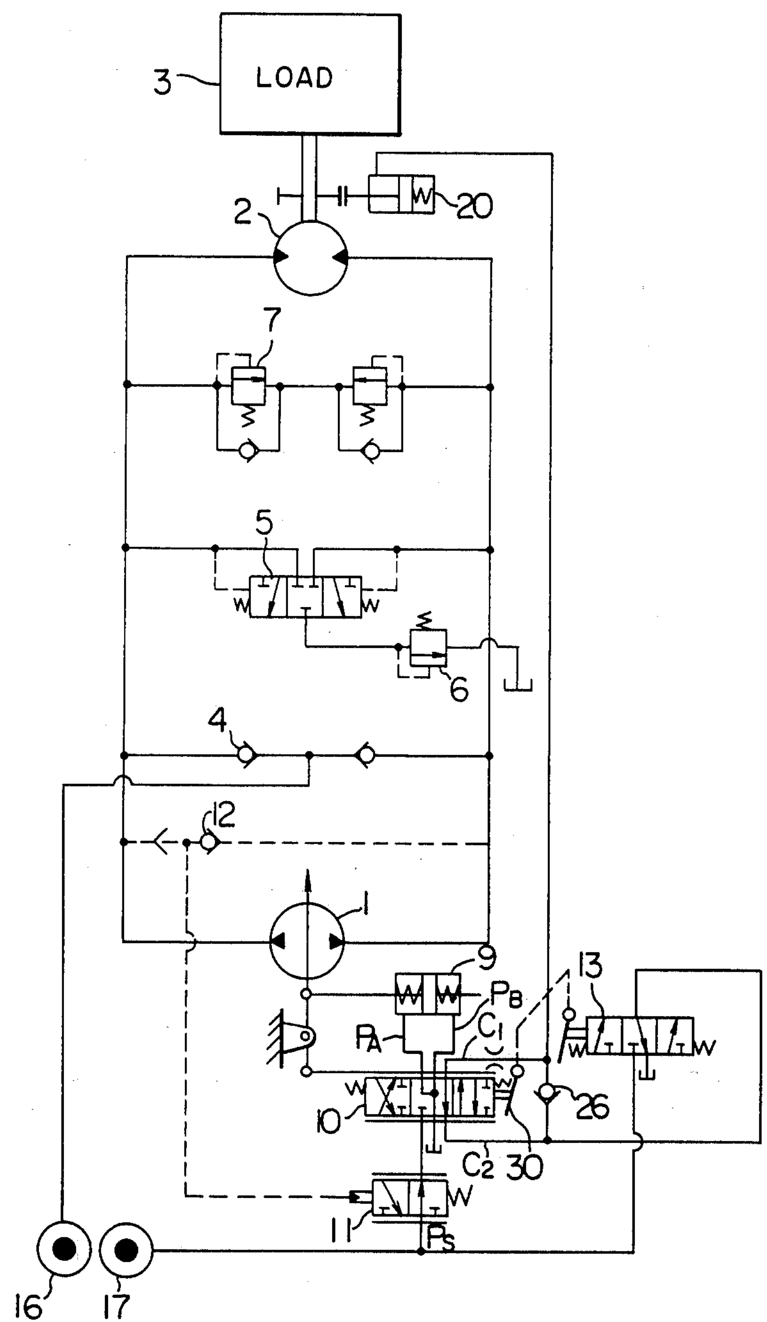

HYDRAULIC POWER SYSTEM

BACKGROUND OF THE INVENTION

This invention relates to hydraulic power systems, and, more particularly, to a hydraulic power system suitable for driving a load having high inertia such as a swivelling member of a hydraulic excavator, wherein motor stopping means for preventing a hydraulic motor from rotating can be automatically actuated.

Generally, in a hydraulic power system suitable for driving, by a hydraulic motor, a load having high inertia, such as a swivelling member of a hydraulic excavator, it is necessary to detect whether the hydraulic motor is inoperative or operating at a velocity near a point at which it is inoperative, in order to automatically actuate motor stopping means for preventing the hydraulic motor from rotating without causing wear or damage thereto.

A control device provided with a detecting means is disclosed, for example, in Japanese Patent Application Laid-Open No. 98470/79 and Japanese Utility Model Application Laid-Open No. 13222/80, wherein the output shaft of a hydraulic motor for actuating a load has connected thereto an ancillary hydraulic pump, separate from a hydraulic pump, for actuating a hydraulic motor, so that the condition of rotation of the hydraulic motor can be detected by the pressure fluid delivered thereby.

In, for example, Japanese Patent Application Laid-Open No. 98471/79, another type of control device is disclosed wherein a throttle valve is mounted anteriorly or posteriorly of a hydraulic motor in a main line in which the hydraulic motor is mounted, so that the flow of hydraulic fluid in the main line can be detected by the differential pressure in the throttle valve and the condition of rotation of the hydraulic motor can thereby be detected.

In still another control device, cross-over relief valves are mounted anteriorly and posteriorly of a hydraulic motor in a main line in which the hydraulic motor is mounted and the relief condition of such valves is detected. On this device, the condition of rotation of the hydraulic motor is detected because the condition of a pumping action of the hydraulic motor is detected.

Some disadvantages are associated with all the control devices of the aforesaid type. More particularly, with a control device employing an ancillary hydraulic pump, the addition of the ancillary hydraulic pump results in a complex construction having a relatively high cost and also a loss of power. In the control device with a throttle valve in the main line, a loss of power occurs due to a pressure loss, and with the control device having cross-over relief valves, it is difficult to obtain accurate results of detection because its performance is generally governed by the characteristics of the cross-over relief valves in which the operation of the relief valves becomes unstable in a low flow rate situation.

In a hydraulic closed circuit, proposals have been made to use a control device which is operative to actuate a motor stopping means for preventing a hydraulic motor from rotating only when a control lever for controlling the displacement volume of a variable displacement hydraulic pump is in a neutral position. When a load of high inertia is driven, the hydraulic motor may continue to rotate while a relieving of the hydraulic fluid is carried out through cross-over relief valves even if the control valve is restored to the neutral position. In order to avoid operation of the motor stopping means in this condition, in, for example, Japanese Patent Application Laid-Open No. 108170/79, it is proposed to provide a predetermined time lag after the control lever is restored to the neutral position before the motor stopping means begins to operate. This time lag is obtained, for example, by providing a throttle valve in a line in which the motor stopping means is mounted. However, setting of a time lag by means of a throttle valve is not desirable because the time lag might be caused to vary by wide changes in the viscosity of the working fluid that might occur when the working fluid undergoes a temperature change. Moreover, as in the case of a swivelling member of a hydraulic excavator, where the inertia of a load applied to the hydraulic motor greatly varies depending on the condition of the load of the earth-moving machine and the position of such load, the period of time in which the relieving condition of the cross-over relief valves continues to exist would greatly vary. Thus, difficulties would be encountered in setting the time lag for allowing the motor stopping means to be actuated immediately after the hydraulic motor is essentially rendered inoperative in such a manner that the time lag suits all the conditions.

SUMMARY OF THE INVENTION

This invention has been developed in view of the status of the art set forth hereinabove. Accordingly the invention has as its object the provision of a hydraulic power system capable of automatically actuating motor stopping means for preventing a hydraulic motor from rotating immediately after the hydraulic motor stops rotating.

The aforesaid object is accomplished according to the invention by providing a hydraulic power system comprising a variable displacement hydraulic pump, a hydraulic motor driven by said hydraulic pump for actuating a load, with the hydraulic pump and hydraulic motor being connected so as to form a closed hydraulic circuit. A hydraulic servo means is provided for controlling the displacement volume of the hydraulic pump, with a motor stopping means preventing, in its operative position, the hydraulic motor from rotating. The hydraulic power system comprises a control valve responsive to a main line pressure in the closed hydraulic circuit for controlling a hydraulic fluid supply to the servo means to prevent said main line pressure from substantially exceeding a predetermined level, and control means responsive to the operation of the servo means for releasing the motor stopping means from the operative position when said servo means is under operation.

In a preferred embodiment, the motor stopping means comprises brake means adapted to release the hydraulic motor from a braked condition when a control pressure from a hydraulic fluid source is received, and the control means comprises first pressure transmission control means associated with input means of the servo means for transmitting the control pressure to the brake means when the input means is actuated, and second pressure transmission control means responsive to the operational pressure of a hydraulic fluid in said servo means on the output side of a servo valve thereof for transmitting the control pressure to the brake means when the operational pressure is substantially higher than a drain pressure.

In another preferred embodiment, the control means comprises first pressure transmission control means associated with input means of the servo means for transmitting the control pressure to the brake means when the input means is actuated, and second pressure transmission control means responsive to the actuation of a servo valve of the servo means for preventing the release of the control pressure received in the brake means until the servo valve is restored to a neutral position.

In still another embodiment, the control means comprises pressure transmission control means responsive to the operational pressure of a hydraulic fluid in the servo means on the output side of a servo valve thereof for transmitting the control pressure to the brake means when the operational pressure is substantially higher than a drain pressure.

It should be noted that in the specification, "the operation of servo means" means not only the operation of the servo means caused by actuating input means of the servo means for accelerating a hydraulic motor and maintaining the speed of the motor at a desired rate, but also the operation of the servo means in a transient intermediate position caused by returning the input means to a neutral position for deceleration of the motor.

BRIEF DESCRIPTION OF THE DRAWINGS

FIG. 3 is a circuit diagram of the hydraulic power system comprising a second embodiment of the present invention;

DESCRIPTION OF THE PREFERRED EMBODIMENTS

Figure 1:
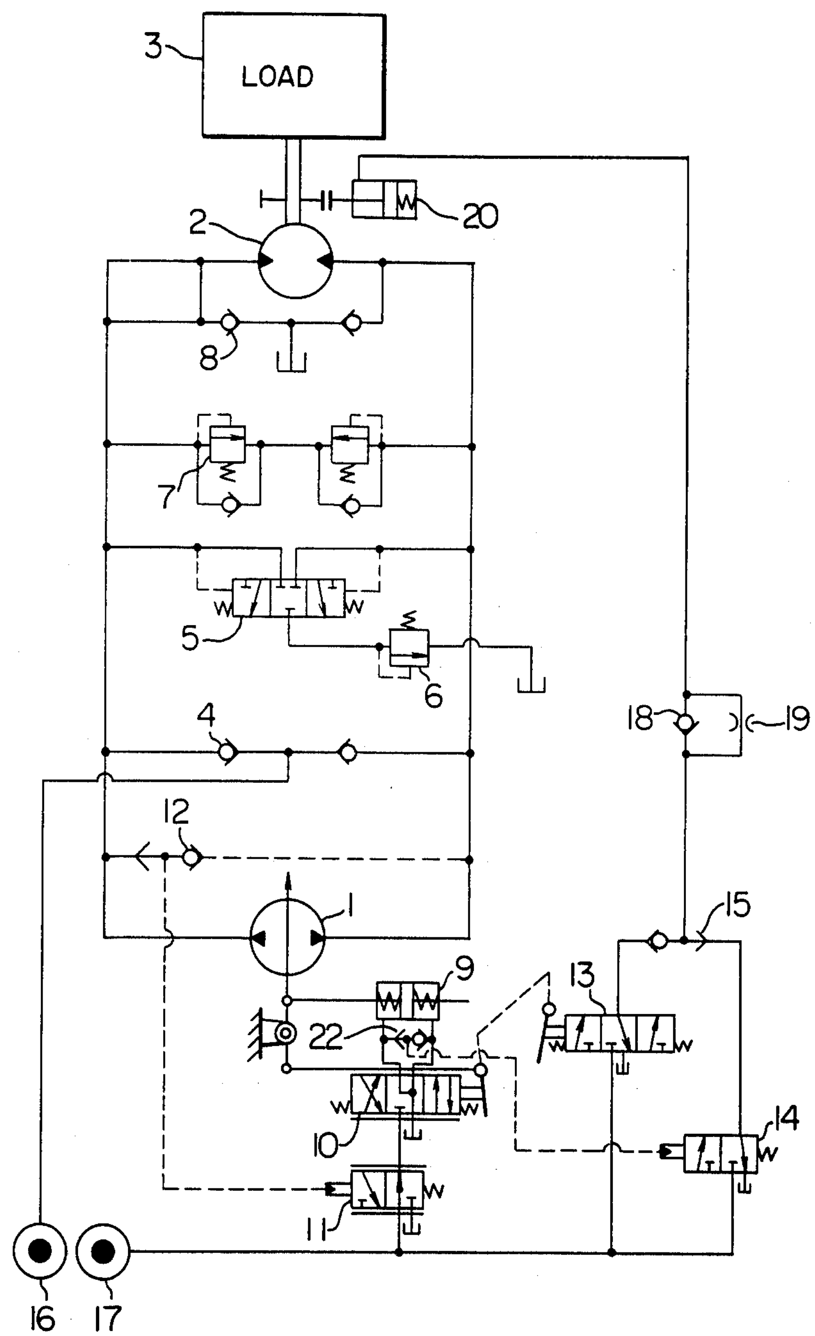
FIG. 1 is a circuit diagram of the hydraulic power system comprising a first embodiment of the present invention.

Referring now to the drawings wherein line reference numerals are used throughout the various views to designate like parts and, more particularly, to FIG. 1, according to this figure a hydraulic power system comprises a variable displacement hydraulic pump 1 and a hydraulic motor 2 driven by the pump 1, with the hydraulic motor 2 being adapted to actuate a load 3. The hydraulic pump 1 and hydraulic motor 2 are connected to form a closed hydraulic circuit, to which a charge of hydraulic fluid is supplied from a hydraulic fluid source 16. Check valves 4 are interposed between main lines connecting the hydraulic pump 1 to the hydraulic motor 2 and the hydraulic fluid source 16. Excess flow of hydraulic fluid in the closed circuit corresponding to the hydraulic fluid from the source 16 is discharged from a lower-pressure main line by means of a flush valve 5. Located downstream of the flush valve 5 is a relief valve 6 for setting a lowest pressure for the closed hydraulic circuit, while a highest pressure for the closed hydraulic circuit is set by cross-over relief valves 7. Check valves 8 are arranged for supplying a hydraulic fluid to the closed hydraulic circuit from a reservoir in the absence of a charge hydraulic fluid from the source 16. The hydraulic pump 1 is connected to a servo cylinder 9 for operating a displacement volume control member of the hydraulic pump 1. The servo cylinder 9 is controlled by a servo valve 10 responsive to actuation of input means, such as an operation lever. The servo cylinder 9 and servo valve 10 constitute a hydraulic servo means for controlling the displacement volume of the variable displacement hydraulic pump 1. The hydraulic motor 2 is prevented from rotating by motor stopping means 20 in its operative position, which may be brake means comprising a hydraulic cylinder applying the brake force to an output shaft of the hydraulic motor 2. The brake means 20 is supplied with a control pressure from a hydraulic fluid source 17 for releasing the break means 20 from the operative position.

The hydraulic power system also comprises a control valve 11 for controlling the operation of the hydraulic servo means connected to the hydraulic fluid source 17. The control valve 11 may be connected to a hydraulic fluid source of a separate system. A shuttle valve 12 is connected to the main lines of the closed circuit for withdrawing pressure from a higher-pressure main line, and the pressure is applied to the control valve 11 for actuation thereof. Stated differently, the control valve 11 uses the pressure in the higher-pressure main line as a pilot pressure for controlling a hydraulic fluid supply to the servo means to prevent the pressure in the main line from substantially exceeding a predetermined level. The control valve 11 is set at a pressure lower than the pressure at which the cross-over relief valves 7 are set.

The system further comprises a shuttle valve 22, mounted in the hydraulic servo means for drawing off a higher pressure in lines interconnecting the servo cylinder 9 and servo valve 10, corresponding to the pressure of a hydraulic fluid on the output side of the servo valve 10, a directional control valve 13 interlocked to an operation lever for operating the servo valve 10, and a directional control valve 14 connected to the shuttle valve 22 operable in response to an operational pressure on the output side of the servo valve. The directional control valves 13 and 14 are connected in parallel with each other in a line connecting the brake means 20 to the hydraulic fluid source 17. A shuttle valve 15 is connected in the line for selecting a higher pressure of the pressures from the valves 13 and 14. Thus, the directional control valve 13 constitutes first pressure transmission control means associated with the input means of the hydraulic servo means for transmitting a control pressure to the brake means 20 when the input means is actuated, and the shuttle valve 22 and the directional control valve 14 constitute second pressure transmission control means responsive to the operational pressure of a hydraulic fluid in the servo means on the output side of the servo valve 10 thereof for transmitting the control pressure to the brake means 20 when the operational pressure is substantially higher than a drain pressure or reservoir pressure. Thus, the first and second pressure transmission control means constitute control means responsive to the operation of the servo means for releasing the motor stopping means from the operative position when the servo means is under operation.

A check valve 18 is mounted in the line connecting the shuttle valve 15 to the brake means 20 for allowing only a flow of hydraulic fluid from the shuttle valve 15 to the brake means, and a throttle valve 19 is mounted in parallel with the check valve 18. The check valve 18 and throttle valve 19 are operative to avoid actuation of the brake means 20 in a transient period such as a period during which an operational pressure is produced on the output side of the servo valve 10 after the input means of the servo valve 10 is brought to a neutral position.

The above-described hydraulic power system operates as follows. In acceleration operation of the hydraulic motor 2, actuation of the operation lever of the servo valve 10 causes the hydraulic servo means, composed of the servo cylinder 9 and servo valve 10, to control the displacement volume of the hydraulic pump 1 in accordance with the actuated stroke of the lever. At this time, the directional control valve, interlocked to the operation lever of the servo valve 10, is switched to allow a control pressure fluid from the hydraulic fluid source 17 to flow through the valve 13, shuttle valve 15 and check valve 18 to the brake means 20 to thereby release the latter from the operative position. As a result, the hydraulic motor 2 tends to operate at a speed commensurate with the displacement volume of the hydraulic pump 1. When the load 3 has high inertia, the hydraulic motor 2 is prevented from immediately reaching the speed of interest, thereby causing the pressure in the hydraulic main line on the discharge side of the pump 1 to rise. The pressure is transmitted through the shuttle valve 12 to the control valve 11 and actuates the same when the pressure exceeds a predetermined level set for actuation thereof. This reduces the flow rate of the fluid supplied from the hydraulic fluid source 17 to the servo valve 10 to thereby reduce the rate of change in the displacement volume of the pump 1 and, thus, in the discharge flow rate thereof. Generally, the drive pressure generated upon driving a load of inertia is proportional to the rate of change in the discharge flow rate of the hydraulic pump 1, and, therefore, the main line pressure is lowered at this time. In this way, the pressure in the main lines is controlled so as not to substantially exceed the predetermined level set by the control valve 11.

In deceleration operation of the hydraulic motor 2 or when the operation lever of the servo valve 10 is returned to a neutral position from a given manipulated position in which the hydraulic motor 2 rotates at a constant speed in steadystate operation, the displacement volume of the hydraulic pump 1 tends to drop by the returning of the operation lever of the servo motor 10 to the neutral position. However, at this time the inertia of the load 3 acts on the hydraulic motor 2 and causes the pressure in the main line on the suction side of the hydraulic pump 1 to rise. This is what is referred to as the pumping action of the hydraulic motor 2. The pressure in the main line on the suction side acts on the control valve 11 through the shuttle valve 12 and reduces the rate of change in the displacement volume of the hydraulic pump 1 so that the pressure in the main line on the suction side is controlled so as not to exceed substantially the predetermined level set by the control valve 11. Since the control valve 11 is set at a level lower than the pressure at which the cross-over relief valves 7 are set, there is no risk of power loss or generation of heat due to the relief operation both in acceleration and deceleration.

When the operation lever of the servo valve 10 is returned to the neutral position, the directional control valve 13 interlocked thereto is also returned to the neutral position to thereby bring a line between the valve 13 and shuttle valve 15 into communication with reservoir. However, at this time the pressure on the suction side of the hydraulic pump 1 quickly rises and the control valve 11 is actuated, so that the servo valve 10 is prevented from quickly following up the operation lever and returning to the neutral position, and remains in a transient intermediate position. Stated differently, the tilting angle of the hydraulic pump 1 is prevented from instantly returning to the neutral position. This brings the pressure on the output side of the servo valve 10 to an intermediate a value between the pressure of a hydraulic fluid supply to the servo means from the hydraulic fluid source 17 which has been controlled by the control valve 11, and a drain pressure or reservoir pressure. The pressure on the output side of the servo valve 10 is drawn off through the shuttle valve 22 to actuate the directional control valve 14. Thus, while the servo valve 10 is in the transient intermediate position, the brake means 20 is released from the operative position by receiving the control pressure from the valve 14. When the servo valve 10 is brought to the neutral position, in which the pump 1 is in the neutral position and the motor 2 substantially stops rotating, the directional control valve 14 is returned to the neutral position, and the brake means 20 is actuated to take the operative position since the directional control valve 13 is also in the neutral position.

It will be noted that in the first embodiment of the hydraulic power system of the invention, it is possible to release the brake means 20 from the operative position not only when the operation lever of the servo valve 10 is actuated but also until the hydraulic motor 2 substantially stops rotating even after the operation lever is returned to the neutral position, and it is also possible to actuate the brake means 20 as soon as the hydraulic motor 2 stops rotating, so that the brake means 20 is completely free from the influences of changes in the inertia of the load 3.

Figure 2:
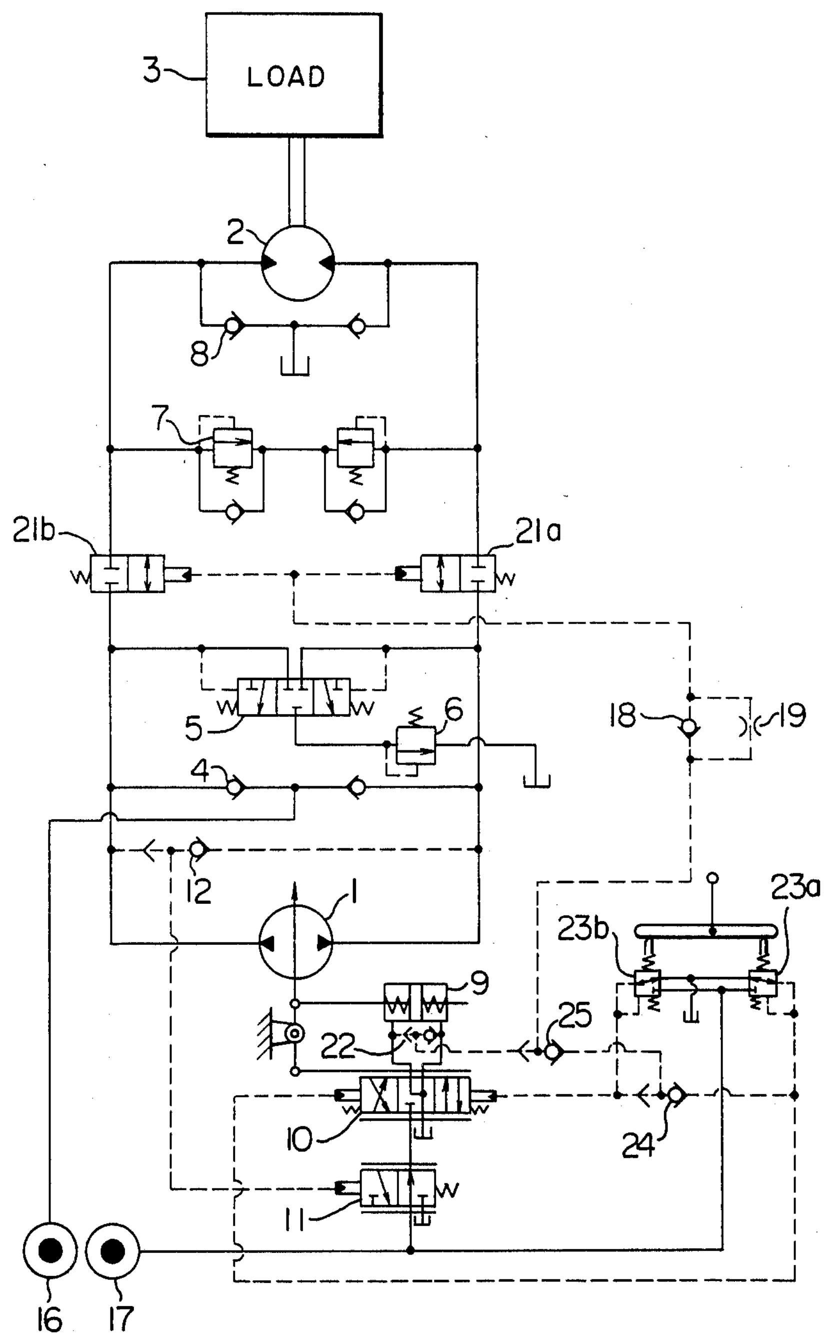
FIG. 2 is a circuit diagram of a modification of the first embodiment shown in FIG. 1.

In FIG. 2, the motor stopping means for preventing the hydraulic motor 2 from rotating comprises brake means in the form of on-off valves **21*a* and 21*b* mounted on the main lines interconnecting the hydraulic pump 1 and hydraulic motor 2. The input means of the servo valve 10 comprises a pair of pilot valves 23*a* and 23*b* operative to produce pilot pressures in accordance with the operated stroke of the operation lever for actuating the servo valve 10 by the pilot pressure. The pilot valves 23*a* and 23*b* are connected to a shuttle valve 24 for drawing off a higher pressure of the two pilot pressures from the pilot valves 23*a* and 23*b*. The pilot valves 23*a* and 23*b* and the shuttle valve 24 are mounted on a line connecting the on-off valves 21*a* and 21*b* to the hydraulic fluid source 17. A shuttle valve 25 is also connected in the line for drawing off a higher pressure of the pressures from the shuttle valves 22 and 24 to actuate the on-off valves 21*a* and 21*b*. The shuttle valve 24 constitute first pressure transmission control means associated with the input means 23*a* and 23*b* of the hydraulic servo means for transmitting a control pressure to the valves 21*a* and 21*b* when the input means are actuated. The shuttle valve 22 constitutes second pressure transmission control means responsive to the operational pressure on the output side of the servo valve 10 for transmitting a control pressure to the valves 21***a* and 21*b* when the operational pressure is substantially higher than a drain pressure. When the servo valve 10 is restored to a neutral position, the control pressure fluid applied to the on-off valves 21*a* and 21*b* is drained to reservoir through the shuttle valve 22 and servo valve 10. The cross-over relief valves 7 are located on the side of the hydraulic motor 2 with respect to the on-off valves 21*a* and 21*b*.

In the embodiment of the hydraulic power system of the aforesaid construction, in hydraulic motor acceleration operation, an actuation of the operation lever of the pilot valves 23*a* and 23*b* causes a control pressure to be supplied to the on-off valves 21*a* and 21*b* through the shuttle valves 24 and 25 and check valve 18. Thus, the on-off valves 21*a* and 21*b* are actuated to allow hydraulic fluid to flow through the main lines, and the pilot pressure produced by the pilot valves 23*a* and 23*b* acts on the servo valve 10 to actuate the hydraulic servo means. The pressure in the main line on the discharge side of the pump 1 is controlled by the control valve 11 so as not to substantially exceed the predetermined level, as is the case with the embodiment shown in FIG. 1.

In deceleration operation of the hydraulic motor 2, the pressure in the main line on the suction side of the hydraulic pump 1 is controlled by the control valve 11 so as not to substantially exceed the predetermined level, as is the case with the embodiment shown in FIG. 1. Moreover, when the operation lever is returned to the neutral position, the pilot valves 23*a* and 23*b* are also restored to the condition shown in FIG. 2 to bring a line connected to the on-off valves 21*a* and 21*b* into communication with reservoir. However, while the servo valve 10 is in a transient intermediate position and the hydraulic motor 2 does not completely stop rotating, a control pressure is supplied to the on-off valves 21*a* and 21*b* through the servo valve 10, shuttle valves 22 and 25 and check valve 18, so that the on-off valves 21*a* and 21*b* allow hydraulic fluid to flow through the main lines. When the servo valve 10 is restored to the neutral position, in which the hydraulic pump 1 is in the neutral position and the hydraulic motor 2 stops rotating, the control pressure that has acted on the on-off valves 21*a* and 21*b* is immediately drained to reservoir through the shuttle valve 22 and servo valve 10, so that the on-off valves 21*a* and 21*b* prevent hydraulic fluid from flowing through the main lines as shown in FIG. 2.

In the construction shown in FIG. 2 in which the on-off valves 21*a* and 21*b* serve as motor stopping means for preventing the hydraulic motor from rotating, the function of the motor stopping means may be inferior to that of the brake means 20 in arresting the actuation of the motor 2. However, the construction of FIG. 2 is much superior in motor arresting function to a construction in which the operation of the hydraulic pump 1 alone is relied upon for accomplishing the function of motor stopping and is equivalent to a construction using a counterbalancing valve in an open circuit. Also, by positioning the cross-over relief valves 7 on the side of the hydraulic motor 2 with respect to the on-off valves 21*a* and 21*b*, it is possible to avoid damage to a power transmission system including the output shaft of the motor 2 and speed reducing gearing in case an inordinately large external force is exerted on the load because the cross-over relief valves 7 are actuated in such case. Moreover, although not shown, the construction shown in FIG. 2 may be further modified such that a directional control valve may be mounted between the shuttle valve 25 and the on-off valves 21*a* and 21*b* and actuated by a pressure from the shuttle valve 25 so as to actuate the on-off valves 21*a* and 21*b* by a pressure from the directional control valve.

It is to be understood that the neutral connection of the servo valve 10, the construction of the input means of the servo valve 10, the connection between the input means and the motor stopping means, and the connection between the input means and the output side of the servo valve 10 are not limited to those shown in FIGS. 1 and 2. In FIG. 1 and 2, the servo valve 10 has been described as having the function of communicating its output side to reservoir when in a neutral position, however, the servo valve 10 is not limited to this construction, and may have other structures or circuit connections, providing that the pressure on the output side of the servo valve 10 is substantially caused to become a drain pressure or reservoir pressure when the servo valve 10 is in a neutral position of the hydraulic pump 1 is neutral.

From the foregoing, it will be appreciated that the hydraulic power system of the invention is provided with a control valve responsive to the pressure in the main lines of a closed hydraulic circuit for controlling a hydraulic fluid supply to the servo means to prevent the main line pressure from substantially exceeding a predetermined level, and control means responsive to the operation of the hydraulic servo means for releasing the motor stopping means from the operative position when the hydraulic servo means is under the operation thereof. By virtue of these features, it is possible to automatically cause the motor stopping means to be actuated to take its operative position as soon as the hydraulic motor stops rotating without the need of mounting a separate ancillary hydraulic motor as used in the prior art, thereby contributing to simplification of the construction. Also, the need to mount a throttle valve in the main lines for detecting the condition of rotation of the hydraulic motor 20 as in the prior art is eliminated, and it is possible to avoid loss of power because the pressure at which the control valve is set is lower than the pressure at which the cross-over relief valves 7 are set. Also, the need to detect the relieving condition of the cross-over relief valves 7 is eliminated, and the need to use means for providing a time lag after the input means of the hydraulic servo means is restored to a neutral position until the time the motor stopping means is actuated is eliminated, so that it is possible to positively actuate the motor stopping means without being influenced by changes in the inertia of the load.

Figure 4:
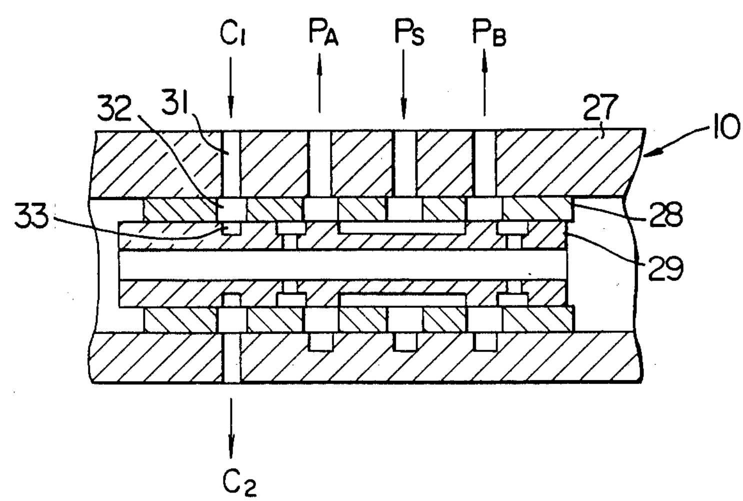
FIG. 4 is a cross-sectional view of one example of the servo valve of the hydraulic servo means of the second embodiment shown in FIG. 3.

In FIG. 3, the servo valve 10 of the hydraulic servo means is interposed between lines $C_1$ and $C_2$ connected to a line communicating the brake means 20 to the hydraulic fluid source 17 and has incorporated therein on-off valve means responsive to the operation of the servo valve 10 for controlling the communication between the two lines $C_1$ and $C_2$. More specifically, as shown in FIG. 4, the servo valve 10 includes a casing 27, a sleeve 28 and a spool 29 with ducts 31, 32 and 33, respectively, for allowing the lines $C_1$ and $C_2$ to communicate with each other. The sleeve 28 and spool 29 are linked to the servo cylinder 9 and an operation lever 30, respectively. A check valve 26 is connected in parallel with the servo valve 10 between the directional control valve 13 and the brake means 20 in the line connecting the brake means 20 to the hydraulic fluid source 17 to allow hydraulic fluid to flow from the directional control valve 13 to the brake means 20 but prevent its flow in the reverse direction.

As in FIG. 1, the directional control valve 13 constitutes first pressure transmission control means associated with the input means 30 of the hydraulic servo means for transmitting a control pressure to the brake means 20 when the input means 30 is actuated. The on-off valve means incorporated in the servo valve 10 constitutes a second pressure transmission control means responsive to the actuation of the servo valve 10 for preventing the release of the control pressure received in the brake means 20 until the servo valve 10 is restored to a neutral position. Thus, the first and second pressure transmission control means constitute control means responsive to the operation of the servo means for releasing the motor stopping means from the operative position when the servo means is under the operation thereof. When the servo valve 10 is restored to the neutral position, the control pressure applied to the brake means 20 is drained to reservoir through the on-off valve means incorporated in the servo valve 10 and the directional control valve 13.

In the hydraulic power system of this construction, during a hydraulic motor acceleration operation, actuation of the operation lever 30 of the servo valve 10 causes the spool 29, shown in FIG. 4, to be displaced in accordance with the operated stroke of the operation lever 30, so that a hydraulic fluid $P_S$, from the hydraulic fluid source 17, is led to the servo valve 10, and a hydraulic fluid $P_A$, in the servo valve 10, is led to the servo cylinder 9 to vary the displacement volume of the hydraulic pump 1. At this time, the directional control valve 13, responsive to the actuation of the operation lever 30 of the servo valve 10, is switched so that the hydraulic fluid $P_S$ from the source 17 is led through the valve 13 and check valve 26 to the brake means 20 to release the latter from the operative position.

Also, the pressure in the main line on the discharge side of the pump 1 is controlled by the control valve 11 so as not to substantially exceed the predetermined level, as in the case with the embodiment shown in FIG. 1.

In hydraulic pump deceleration operation, the pressure in the main line on the suction side of the hydraulic pump 1 is controlled by the control valve 11 so as not to substantially exceed the predetermined level, as is the case with the embodiment shown in FIG. 1.

When the operation lever 30 of the servo valve 10 is restored to a neutral position, the valve 13, interlocked thereto, is also restored to a neutral position, However, at this time, the pressure on the suction side of the hydraulic pump 1 immediately rises to actuate the control valve 11. Thus, the servo valve 10 is prevented from following the operation lever 30 and quickly returning to the neutral position, and is maintained in a transient intermediate position. Stated differently, the tilting angle of the hydraulic pump 1 is prevented from quickly moving to a neutral position. At this time, the lines $C_1$ and $C_2$ are blocked by the on-off valve means incorporated in the servo valve 10. Therefore, so long as the servo valve 10 is in the transient intermediate position, the control pressure received in the brake means 20 is prevented from releasing by the blocking of the servo valve 10 and check valve 26 and the brake means 20 can be kept released from the operative position. When the servo valve 10 is restored to the neutral position, in which the hydraulic pump 1 is in the neutral position and the hydraulic motor 2 substantially stops rotating, the directional control valve 13 is already in the neutral position and the lines $C_1$ and $C_2$ are brought into communication with each other through the casing 27, sleeve 28 and spool 29 of the servo valve 10, so that the control pressure received in the brake means 20 is drained to reservoir through the servo valve 10 and valve 13 to allow the brake means 20 to be actuated to take the operative position.

It will be noted that in the second embodiment of the hydraulic power system shown in FIG. 3 in conformity with the invention, it is possible to release the brake means 20 from the operative position not only when the operation valve 30 of the servo valve 10 is actuated but also until the hydraulic motor 2 substantially stops rotating even after the operation lever 30 is returned to the neutral position, and it is also possible to actuate the brake means 20 as soon as the motor 2 stops rotating, so that the brake means 20 is completely free from the influences that might otherwise be exerted thereon by changes in the inertia of the load.

Figure 5:
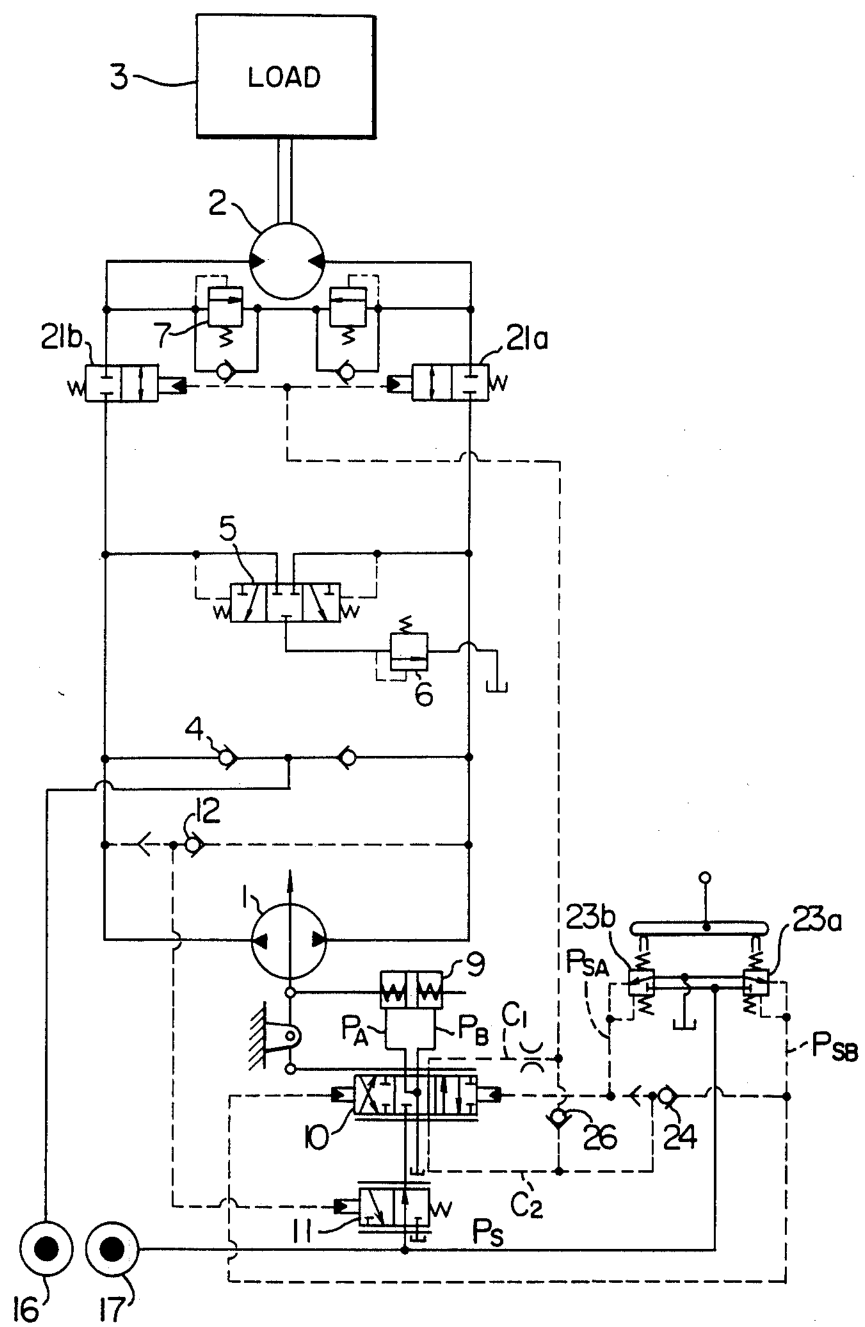
FIG. 5 is a circuit diagram of a modification of the second embodiment shown in FIG. 3.

In FIG. 5, the on-off valves **21*a* and 21*b* mounted in the main lines connecting the hydraulic pump 1 and hydraulic motor 2, are used as motor stopping means for preventing the hydraulic motor 2 from rotating, as in the modification of the first embodiment shown in FIG. 2. The pilot valves 23*a* and 23*b*, operative to produce pilot pressures in accordance with the operated stroke of the operation lever for actuating the servo valve 10 by the pilot pressure are used as input means of the servo valve 10, as is the case with the modification shown in FIG. 4. The pilot pressure from the pilot valves 23*a* or 23*b* are drawn off by the shuttle valve 24. The pilot valves 23*a* and 23*b* and the shuttle valve 24 are connected in a line connecting the on-off valves 21*a* and 21*b* to the hydraulic fluid source 17. The servo valve 10 is of the same construction as the servo valve 10 shown in FIG. 4. More specifically, the servo valve 10 is interposed between the lines $C_1$ and $C_2$ connected to the line connecting the on-off valves 21*a* and 21*b* to the source 17, and the servo valve 10 has incorporated therein on-off valve means responsive to the actuation of the servo valve 10 for bringing the lines $C_1$ and $C_2$ into communication with each other only when both the hydraulic servo means and the operation lever are in a neutral position. The check valve 26 is connected in parallel with the servo valve 10 between the pilot valves 23*a* and 23*b* and the on-off valves 21*a* and 21*b* in the line connecting the on-off valves 21*a* and 21*b* to the source 17, to allow hydraulic fluid to flow from the pilot valves 23*a* and 23*b* to the on-off valves 21*a* and 21*b*** but prevent the flow of hydraulic fluid in the reverse direction.

The shuttle valve 24 constitutes first pressure transmission control means associated with the input means **23*a* and 23*b* of the hydraulic servo means for transmitting a control pressure to the brake means 21*a* and, 21*b* when the input means 23*a* and 23*b* are actuated. The on-off valve means incorporated in the servo valve 10 as constitutes a second pressure transmission control means responsive to the actuation of the servo valve 10 for preventing the release of the control pressure received in the on-off valves 21*a* and 21*b* until the servo valve 10 is restored to a neutral position. When the servo valve 10 is restored to the neutral position, the control pressure applied to the on-off valves 21*a* and 21*b* is drained to reservoir through the on-off valve means incorporated in the servo valve 10, shuttle valve 24 and pilot valves 21***a* and 21*b*.

In the hydraulic power system of this construction, in hydraulic motor acceleration operation, actuation of the operation lever of the pilot valves 23*a* and 23*b* causes an output pressure $P_{SA}$ or $P_{SB}$ of the pilot valve 23*a* or 23*b* to be supplied from the source 17 through the check valve 26 to the on-off valves 21*a* and 21*b*, so that the on-off valves 21*a* and 21*b* allow hydraulic fluid to flow through the main lines. Also, an output pressure of the pilot valve 23*a* or 23*b* acts on the servo valve 10 to operate the hydraulic servo means. In hydraulic motor deceleration operation, the pressure in the main line on the suction side of the hydraulic pump 1 is controlled by the control valve 11 so as not to substantially exceed the predetermined level, in the same manner as described by referring to the embodiment shown in FIG. 3. When the operation lever is restored to a neutral position, the pilot valve 23*a* or 23*b* is returned to the position shown in FIG. 5 to bring the line to the on-off valves 21*a* and 21*b* into communication with reservoir. However, so long as the servo valve 10 is in a transient intermediate position and the hydraulic motor 2 does not completely stop rotating, the control pressure received in the on-off valves 21*a* and 21*b* is prevented from draining by the on-off valve means incorporated in the servo valve 10 and the check valve 26, so that the on-off valves 21*a* and 21*b* allow hydraulic fluid to flow through the main lines. When the servo valve 10 is brought to the neutral position, in which the hydraulic pump 1 is in the neutral position and the hydraulic motor 2 completely stops rotating, the lines $C_1$ and $C_2$ are brought into communication with each other to allow the control pressure for the on-off valves 21*a* and 21*b* to be drained to reservoir through the servo valve 10, the shuttle valve 24 and the pilot valves 21*a* and 23*b*. Thus, the flow of the pressure fluid through the main lines interrupted as shown in FIG. 5.

It will be noted that the construction of the input means of the servo valve 10, the neutral connection of the servo valve 10 and the connection between the input means and the motor stopping means are not limited to those shown in FIGS. 3 to 5. Particularly, in FIGS. 3 to 5, the servo valve 10 is shown as having the function of communicating its output side to reservoir when in a neutral position, however, the servo valve 10 is not limited to this specific construction, and may have other structures or circuit connections, providing that the pressure on the output side of the servo valve 10 is caused substantially to become a drain pressure when the servo valve 10 is in the neutral position or the hydraulic pump 1 is neutral.

Figure 7:
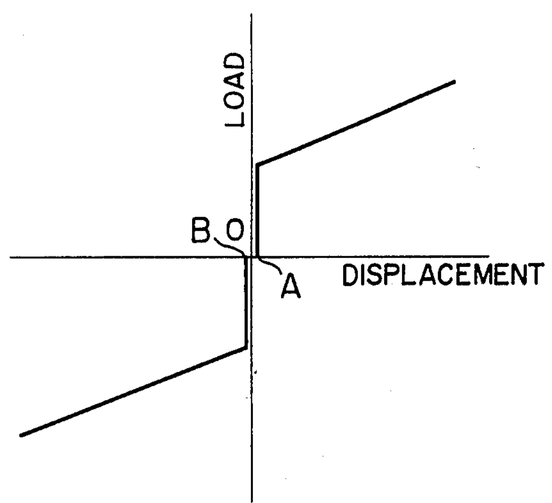
FIG. 7 is a graph showing the values at which is set the reaction imparting means associated with the servo means of the third embodiment shown in FIG. 6.
Figure 6:
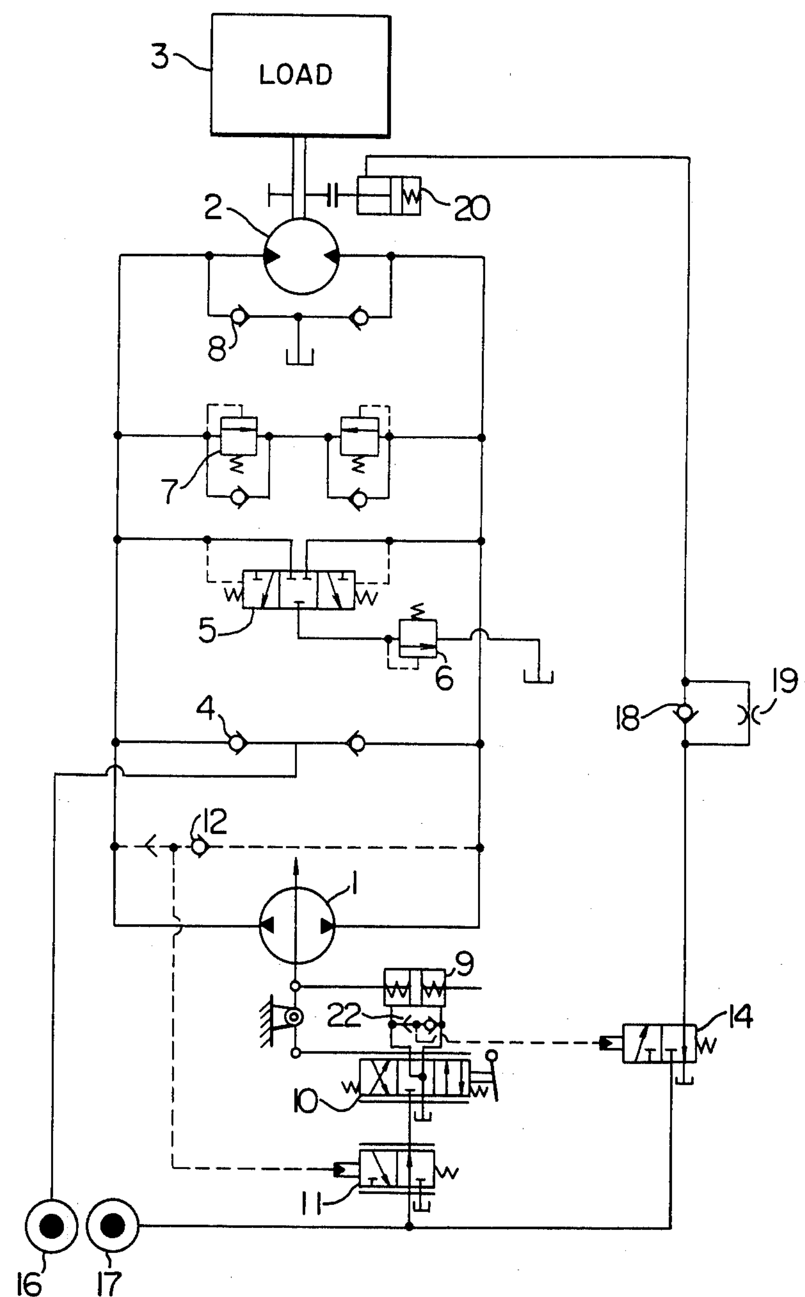
FIG. 6 is a circuit diagram of the hydraulic power system comprising a third embodiment of the present invention.

As shown in FIG. 6, the servo cylinder 9 of the hydraulic servo means actuates a displacement volume control member of the variable displacement hydraulic pump 1 and is provided with reaction imparting means (hereinafter referred to as spring means) for imparting a reaction to cause a load which is reduced to a predetermined level in the vicinity of a neutral position as shown in FIG. 7 at A and B. The shuttle valve 22 draws off a higher pressure from lines interconnecting the servo cylinder 9 and servo valve 10, which pressure corresponds to a pressure on the output side of the servo valve 10. The directional control valve 14 is connected to the shuttle valve 22 to operate in response to the pressure on the output side of the servo valve 10. The valve 14 is connected in a line connecting the brake means 20 to the hydraulic fluid source 17.

The shuttle valve 22 and change-over valve 14 constitute a pressure transmission control means responsive to the operational pressure of a hydraulic fluid on the output side of the servo valve 10 of the hydraulic servo means for transmitting a control pressure to the brake means 20 when the operational pressure is higher than the predetermined level of the load is substantially higher than a drain pressure. Thus, the pressure transmission control means constitutes control means responsive to the operation of the hydraulic servo means for releasing the motor stopping means from the operative position when the hydraulic servo means is under the operation thereof.

In the hydraulic power system of the aforesaid construction, in hydraulic motor acceleration operation, actuation of the operation lever of the servo valve 10 causes the displacement volume of the hydraulic pump 1 to be adjusted by the hydraulic servo means while the pressure in the main line on the discharge side of the pump 1 is controlled by the control valve 11 not to substantially exceed the predetermined level. At this time, the directional control valve 14 is switched by the operational pressure on the output side of the servo valve 10 drawn off by the shuttle valve 22, so that 2 control pressure is led from the source 17 to the brake means 20 through the valve 14 and check valve 18 to release the brake means 20 from the operative position.

When the servo cylinder 9 is displaced by an amount commensurate with the operated stroke of the operation lever of the servo valve 10, the spring means in the servo cylinder 9 produces a load which is commensurate with the displacement as shown in FIG. 7. This causes a reaction corresponding to the load to be generated on the output side of the servo motor, so that the directional control valve 14 is kept in the switched position to release the brake means 20 from the operative position.

In hydraulic motor deceleration operation, the pressure in the main line on the suction side of the hydraulic pump 1 is controlled by the control valve 11 not to substantially exceed the predetermined level, as is the case with the embodiment shown in FIG. 1.

When the operation lever of the servo valve 10 is restored to a neutral position, an operation substantially similar to the operation described by referring to the embodiment shown in FIG. 1 is performed. More specifically, the pressure on the suction side of the hydraulic pump 1 quickly rises and the control valve 11 is actuated, so that the servo valve 10 is prevented from quickly following up the operation lever and returning to the neutral position, and maintained in a transient intermediate position. Thus, the tilting angle of the hydraulic pump 1 is prevented from immediately returning to the neutral position. Thus, the pressure on the output side of the servo valve 10 has a value intermediate between the pressure of a hydraulic fluid supply to the servo means which has been controlled by the control valve and a drain pressure. The pressure of this valve is drawn off through the shuttle valve 22 to actuate the directional control valve 14. Thus, while the servo valve 10 remains in the transient intermediate position, it is possible to keep releasing the brake means 20 from the operative position by a control pressure from the valve 14. When the servo valve 10 is brought to the neutral position, in which the pump 1 is in the neutral position and the hydraulic motor 2 substantially stops rotating, the load applied by the spring means is reduced in value and the pressure on the output side of the servo valve 10 is reduced to restore the valve 14 to the neutral position. Thus, the brake means 20 is actuated to take the operative position.

It will be noted that in the third embodiment of the hydraulic power system in conformity with the invention, it is possible to release the brake means 20 from the operative position not only when the operation lever of the servo valve 10 is actuated but also until the hydraulic motor 2 substantially stops rotating even after the operation lever is returned to the neutral position, and it is also possible to actuate the brake means 20 as soon as the hydraulic motor 2 stops rotating, so that the brake means 20 is completely free from the influences which might otherwise be exerted thereon by changes in the inertia of the load.

Figure 8:
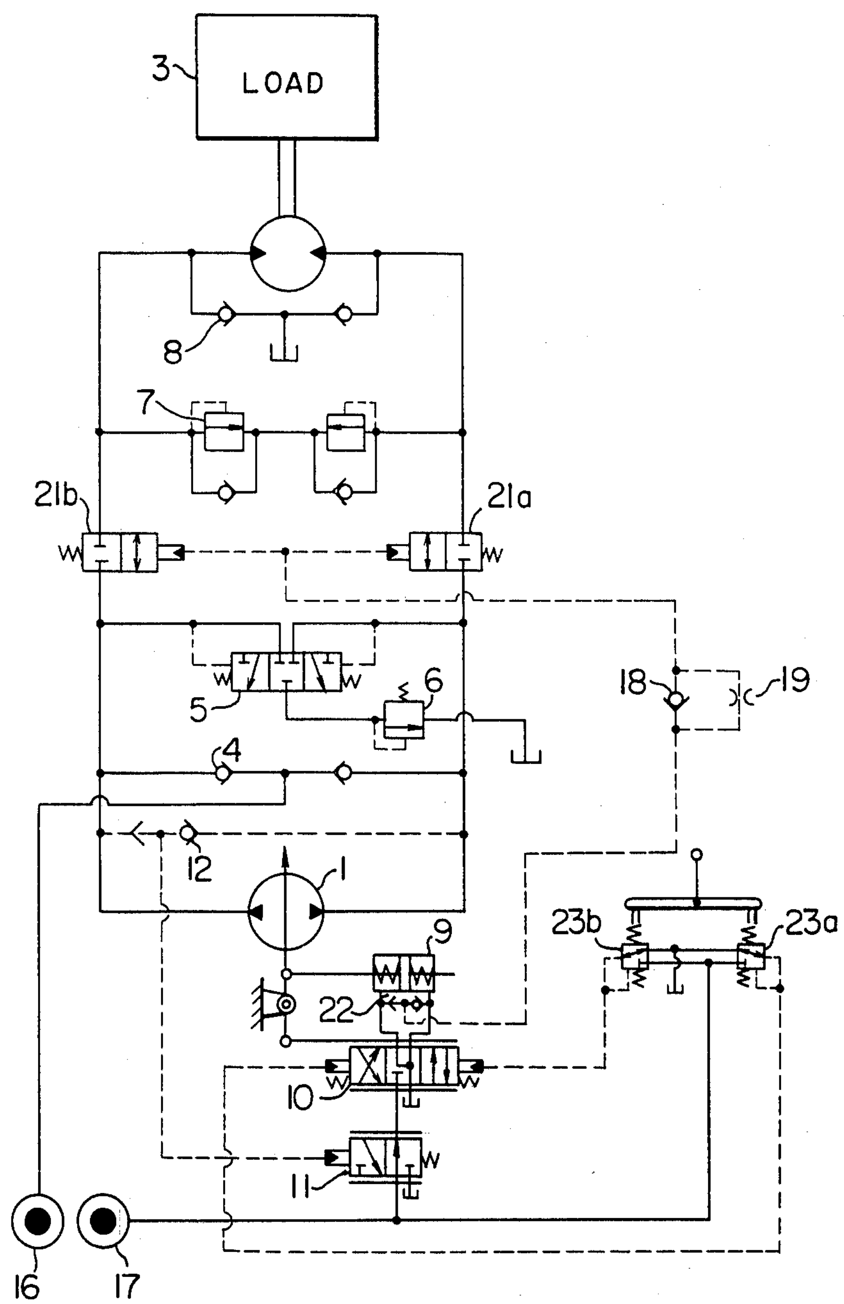
FIG. 8 is a circuit diagram of a modification of the third embodiment shown in FIG. 6.

In FIG. 8, the on-off valves 21*a* and 21*b*, mounted on the main lines connecting the hydraulic pump 1 to the hydraulic motor 2 are used as motor stopping means for preventing the hydraulic motor 2 from rotating, as is the case with the modification shown in FIG. 2. The pilot valves 23*a* and 23*b*, operative to generate pilot pressures in accordance with the operated stroke of the operation lever for actuating the servo valve 10 by this pilot pressure, are used as input means of the servo valve 10, as is the case with the modification shown in FIG. 2. The shuttle valve 22 draws off the operational pressure on the output side of the servo valve 10 of the hydraulic servo means and transmits it to the on-off valves 21*a* and 21*b*. Thus, the shuttle valve 22 constitutes pressure transmission control means responsive to the operational pressure of a hydraulic fluid on the output side of the servo valve 10 of the hydraulic servo means for transmitting a control pressure to the on-off valves 21*a* and 21*b* when the pressure is substantially higher than a drain pressure.

In the hydraulic power system of the construction shown in FIG. 8, in hydraulic motor acceleration operation, actuation of the operation lever of the pilot valves 23*a* and 23*b* renders the servo valve 10 operative, and an operational pressure produced on the output side of the servo valve 10 is transmitted through the shuttle valve 22 and check valve 18 to the on-off valves 23*a* and 23*b*, so that the on-off valves 21*a* and 21*b* allow hydraulic fluid to flow through the main lines. Also, the pressure in the main line on the discharge side of the pump 1 is controlled not to substantially exceed the predetermined level, as is the case with the embodiment shown in FIG. 6. In hydraulic motor deceleration operation, the pressure in the main line on the suction side of the pump 1 is controlled not to substantially exceed the predetermined level, as is the case with the embodiment shown in FIG. 6. When the operation lever is restored to a neutral position, the pilot valves 23*a* and 23*b* are restored to the position shown in FIG. 8. However, while the servo valve 10 remains in a transient intermediate position and the hydraulic motor 2 does not completely stop rotating, the operational pressure on the output side of the servo valve 10 continues to act on the on-off valves 21*a* and 21*b* through the shuttle valve 22 and check valve 18, so that the on-off valves 21*a* and 21*b* allow hydraulic fluid to flow through the main lines. When the servo valve 10 is brought to the neutral position, in which the pump 1 is in the neutral position and the motor stops rotating, the on-off valves 21*a* and 21*b* are immediately actuated to prevent hydraulic fluid from flowing through the main lines, as shown in FIG. 8.

It will be noted that the neutral connection of the servo valve 10, the construction of the input means of the servo valve 10, the connection between the output side of the servo valve 10 and the motor stopping means, and the characteristics of the spring means are not limited to those described in the embodiments shown in FIGS. 6–8, and they may comprise other structures or circuit connections providing that the motor stopping means is released from the operative position when the servo means is under operation, and the motor stopping means is actuated to take the operative position when the servo valve 10 is in a neutral position or when the hydraulic pump 1 is in a neutral position.

It will be also noted that it is not essential that the reaction imparting means is mounted in the servo cylinder 9, and such means has only to be maintained in engagement with an operation member for adjusting the displacement volume of the pump 1 or a connecting member coupled to such operation member.

From the foregoing, it will be appreciated that in the second and third embodiments of the hydraulic power system in conformity with the invention, as in the first embodiment shown in FIG. 1, there are provided a control valve responsive to a main line pressure in the closed circuit for controlling a hydraulic fluid supply to the hydraulic servo means to prevent the main line pressure from substantially exceeding a predetermined level, and control means responsive to the operation of the hydraulic servo means for releasing the motor stopping means from the operative position when the servo means is under the operation thereof. By virtue of these features, it is possible to automatically cause the motor stopping means to be actuated to take the operative position immediately after the hydraulic motor stops rotating without need to mount a separate ancillary hydraulic motor used in the prior art, thereby contributing to simplification of the construction. Also, the need to mount a throttle valve in the main lines for detecting the condition of rotation of the hydraulic motor as is the case with the prior art is eliminated, and it is possible to avoid a loss of power because the pressure at which the control valve is set is lower than the pressure at which the cross-over relief valves are set. Also, the need to detect the relieving condition of the cross-over relief valves is eliminated, and the need to use means for providing a time lag after the input means is restored to a neutral position until the motor stopping means is actuated is eliminated, so that it is possible to positively actuate the motor stopping means without being influenced by changes in the inertia of the load.

We claim:

1. A hydraulic power system comprising a variable displacement hydraulic pump, a hydraulic motor driven by said hydraulic pump for actuating a load of a relatively large inertia, said pump and motor being connected to constitute a closed hydraulic circuit, hydraulic servo means operated by a hydraulic fluid supplied through a fluid supply line from a hydraulic source for controlling a displacement volume of said pump in accordance with an operation of input means, and pressure control valve means connected in said fluid supply line and responsive to a main line pressure in said closed hydraulic circuit for reducing the supply of said hydraulic fluid to said servo means so as to prevent said main line pressure from exceeding a predetermined level when the main line pressure increases due to the inertia of the load, wherein:

motor stop means for preventing, in an operative position thereof, said motor from rotating;

first control means responsive to the operation of said input means for enabling the motor stop means to be released from the operative position not later than when said motor is caused to rotate when said input means is operated to initiate rotation of said motor and to be held released from the operative position when said input means is operated to continue rotation of said motor;

means including said servo means and said pressure control valve means for watching said main line pressure to hydraulically detect a condition of rotation of said motor and generate a signal indicative of a rotation of said motor when said input means is operated to return to its neutral position, said motor rotation signal comprising a change in condition caused by the operations of said servo means and pressure control valve means in combination; and second control means responsive to said motor rotation signal for enabling said motor stop means to be released from the operative position whereby said motor stop means is maintained in a release from from the operative position when said motor is still caused to rotate due to the inertia of said load after said input means is operated to return to its neutral position, while it is brought into the operative position in the absence of said motor rotation signal when said motor completely ceases to rotate.

2. A hydraulic system as claimed in claim 1, wherein said motor stopping means comprises brake means adapted to release the hydraulic motor from a braked condition when a control pressure from a hydraulic fluid source is received, said first and second control means comprise first and second pressure transmission control means respectively responsive to the operation of said input means and motor rotation signal for transmitting said control pressure to said brake means.

3. A hydraulic power system as claimed in claim 2, wherein said brake means comprises a brake cylinder for applying the brake force to an output shaft of said hydraulic motor.

4. A hydraulic power system as claimed in claim 2, wherein said brake means comprises on-off valves mounted in main lines of the closed hydraulic circuit.

5. A hydraulic power system as claimed in claim 1, wherein said motor stopping means comprises brake means adapted to release the hydraulic motor from a braked condition when a control pressure from a hydraulic fluid source is received, said first control means comprises first pressure transmission control means associated with the input means of said hydraulic servo means for transmitting said control pressure to said brake means when said input means is actuated, and said second control means comprises second pressure transmission control means responsive to the operational pressure of a hydraulic fluid in said hydraulic servo means on the output side of a servo valve thereof for transmitting said control pressure to said brake means when said operational pressure is substantially higher than a drain pressure.

6. A hydraulic power system as claimed in claim 5, wherein said first pressure transmission control means comprises a first directional control valve interlocked with said input means of said hydraulic servo means, and said second pressure transmission control means comprises a shuttle valve for drawing off said operational pressure on the output side of said servo valve, and a second directional control valve connected in parallel with said first directional control valve and actuated by said operational pressure drawn off through said shuttle valve.

7. A hydraulic power system as claimed in claim 6, further comprising line means for transmitting said control pressure therethrough to said brake means, and a shuttle valve connected to said line means for selecting, as said control pressure, a higher pressure of the pressures from said first and second directional control valves, and said first and second directional control valves allow said line means to be communicated with a drain when they are not actuated.

8. A hydraulic power system as claimed in claim 5, wherein said input means of said hydraulic servo means comprises a pair of pilot valves, said first pressure transmission control means comprises a first shuttle valve for drawing off a higher pressure of the pilot pressures from said pair of pilot valves, and said second pressure transmission control means comprises a second shuttle valve for drawing off said operational pressure on the output side of said servo valve, line means for transmitting said control pressure therethrough to said brake means, and third shuttle means connected to said line means for selecting, as said control pressure, a higher pressure of the pressures from said first and second shuttle valves.

9. A hydraulic power system as claimed in claim 1, wherein said motor stopping means comprises brake means adapted to release said hydraulic motor from a braked condition when a control pressure from a hydraulic fluid source is received, and said first control means comprises first pressure transmission control means associated with input means of said hydraulic servo means for transmitting said control pressure to said brake means when said input means is actuated, and said second pressure transmission control means is responsive to the actuation of a servo valve of said servo means for preventing the release of said control pressure received in said brake means until said servo valve is restored to a neutral position.

10. A hydraulic power transmission system as claimed in claim 9, wherein said first pressure transmission control means comprises a directional control valve interlocked with said input means of said hydraulic servo means, and said second pressure transmission control means comprises on-off valve means incorporated in said servo valve.

11. A hydraulic power system as claimed in claim 10, further comprising line means for transmitting said control pressure therethrough to said brake means, and a check valve connected to said line means in parallel with said on-off valve means for preventing said control pressure from returning to said directional control valve.

12. A hydraulic power system as claimed in claim 9, wherein said input means of said servo means comprises a pair of pilot valves, said first pressure transmission control means comprises a shuttle valve for drawing off as a control pressure a higher pressure of the pilot pressures from said pair of pilot valves, and said second pressure transmission control means comprises on-off valve means incorporated in said servo valve.

13. A hydraulic power system as claimed in claim 1, further comprising line means for transmitting said control pressure therethrough to said brake means, and a check valve connected to said line means in parallel with said on-off valve means for preventing said control pressure transmitted to said brake means from returning to said shuttle valve through said check valve.

14. A hydraulic power system as claimed in claim 1, wherein said motor stopping means comprises brake means adapted to release said motor from a braked condition when a control pressure from a pressure fluid source is received, and said first and second control means comprises pressure transmission control means responsive to the operational pressure of a hydraulic fluid in said servo means on the output side of a servo valve thereof for transmitting said control pressure to said brake means when said operational pressure is substantially higher than a drain pressure.

15. A hydraulic power system according to claim 14, wherein said first and second control means further comprises reaction imparting means mounted in said hydraulic servo means for causing said operational pressure to be generated on the output side of said servo valve when said hydraulic servo means is displaced from a neutral position.

16. A hydraulic power system as claimed in claim 15, wherein said reaction imparting means comprises spring means mounted in a servo cylinder of said hydraulic means.

17. A hydraulic power system as claimed in claim 14, wherein said pressure transmission control means comprises a shuttle valve for drawing off said operational pressure on the output side of said servo valve, and a directional control valve actuated by said operational pressure drawn off through said shuttle valve.

18. A hydraulic power system as claimed in claim 14, wherein said pressure transmission control means comprises a shuttle valve for drawing off said operational pressure on the output side of said servo valve for using it as said control pressure.

* * * * *